April 18, 1950  H. CONSTANT  2,504,181
DOUBLE COMPOUND INDEPENDENT ROTOR TURBOJET POWER UNIT
Filed April 21, 1945  3 Sheets-Sheet 1

Inventor
Hayne Constant
By
Loyd Hall Sutton
Attorney

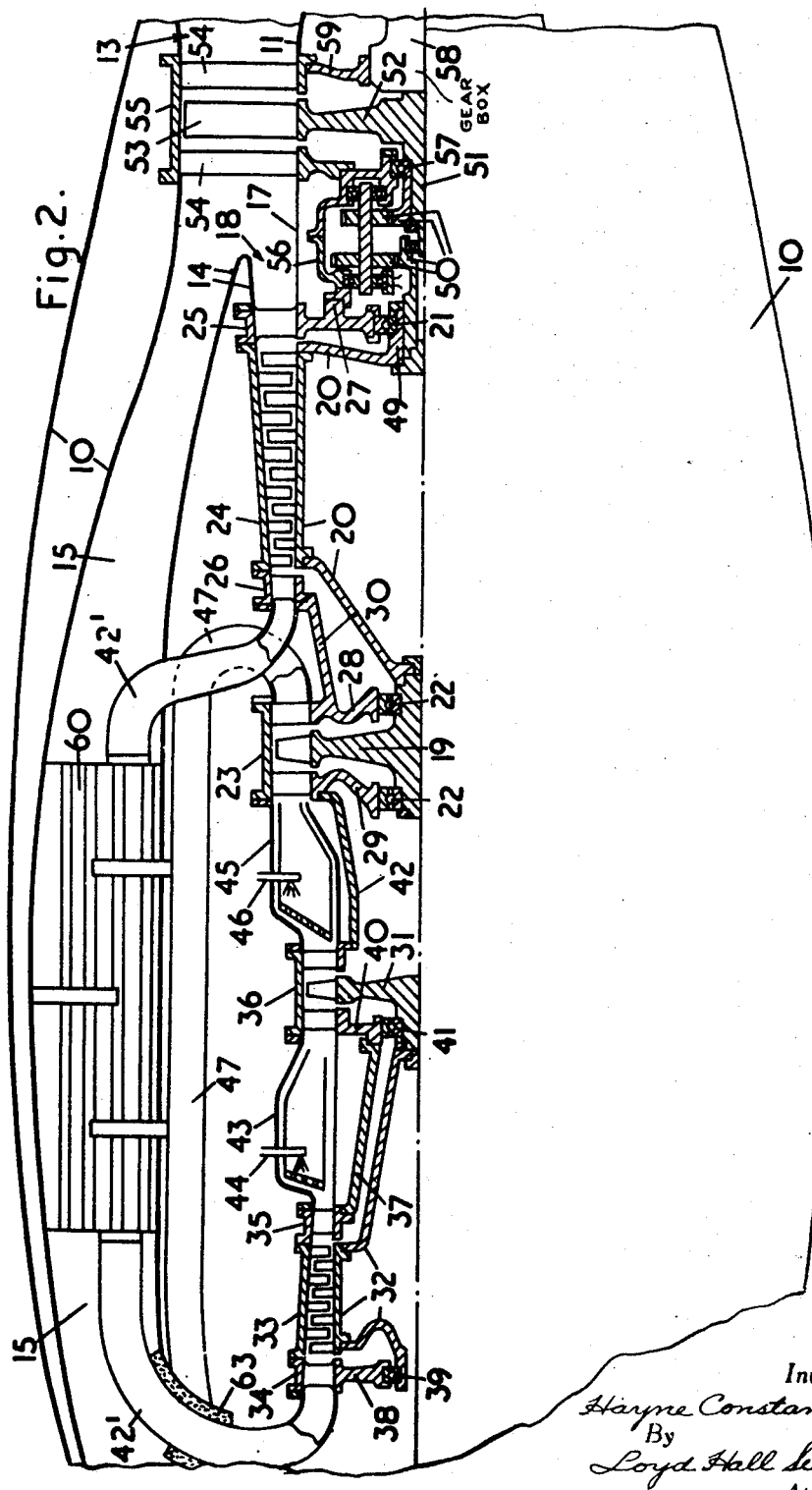

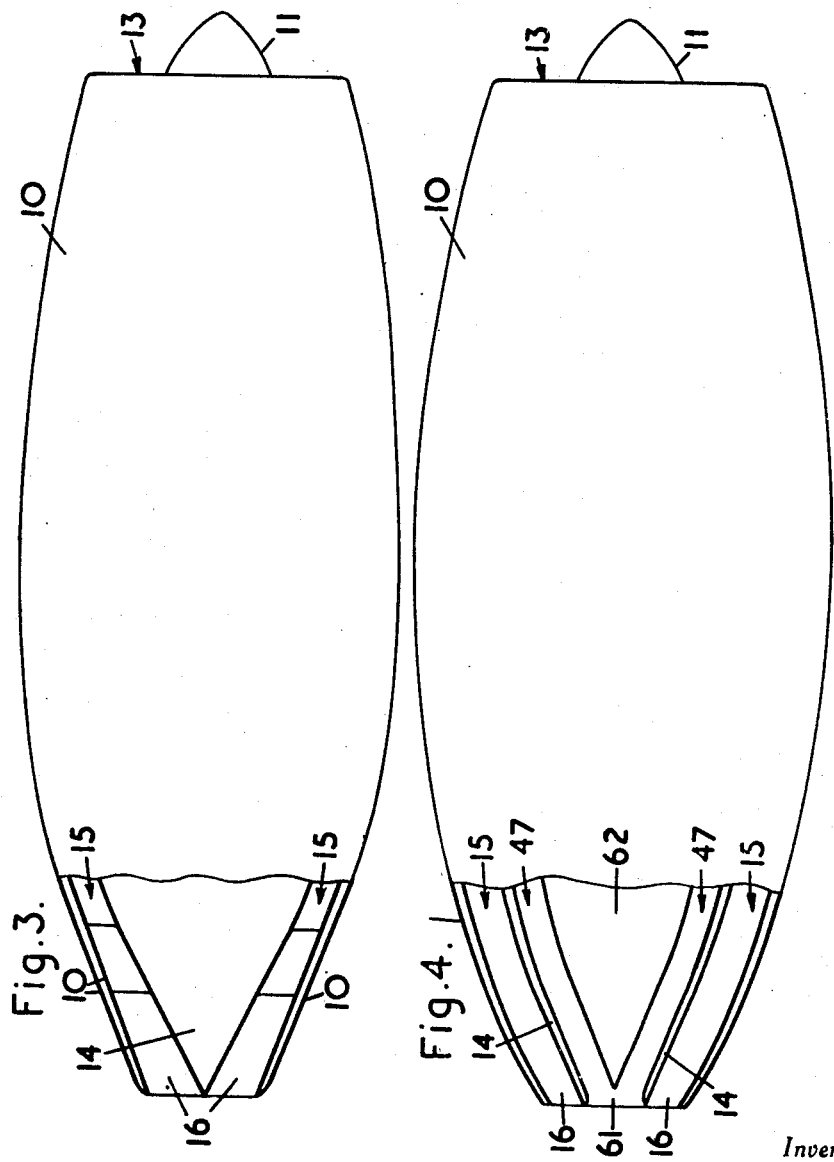

Patented Apr. 18, 1950

2,504,181

UNITED STATES PATENT OFFICE 2,504,181

DOUBLE COMPOUND INDEPENDENT ROTOR TURBOJET POWER UNIT

Hayne Constant, Farnborough Park, England, assignor to Power Jets (Research and Development) Ltd., London, England, a British company Application April 21, 1945, Serial No. 589,671
In Great Britain April 22, 1944

6 Claims. (Cl. 60—35.6)

This invention relates to the use, as an aircraft prime mover (by which is meant a unit which constitutes an effective propulsion unit of an aircraft), of an internal combustion turbine power plant of the type, referred to herein as double compound, in which there are two mechanically independent rotors capable of running at different rotational speeds and each consisting of a compressor and a driving turbine. In this type of power plant the air, after flowing through the compressors in series, passes into a combustion chamber into which fuel is injected and burnt, and the gaseous products of combustion are then expanded through the turbines. Shaft power may be taken either from one of the rotors or from a separate power turbine.

The useful power of a compound engine, and in certain arrangements the efficiency also, may be materially increased by employing what is usually referred to as reheating; this consists in injecting and burning additional fuel in the gaseous products from the combustion chamber at a point or points between adjacent turbines or turbine stages.

It is usual to connect mechanically the high pressure turbine to the high pressure compressor and the low pressure turbine to the low pressure compressor, in order to obtain the most efficient and flexible operation of the double compound engine. In the application of double compounding to aircraft practice, this desirable arrangement is liable to entail, in actual design, either the use of concentric shafts and considerable attendant mechanical complication or the use of complicated ducting with consequent excessive pressure losses. Moreover, if reheating is to be employed and combustion in the turbine blading is to be avoided, the design is further complicated in providing sufficient space for completion of the combustion.

In order to provide a satisfactory double compound prime mover for aircraft, with reheating between the turbines, the invention contemplates the use of a double compound engine in which the low and high pressure rotors are arranged in axial alignment and adjacent one another, whilst so devising the engine that reheating is provided for without involved concentric shafting for the high and low pressure rotors and attendant mechanical complications and whilst permitting a simple form of reheating ducting to be employed between the high and low pressure turbines.

To this end, according to the invention, the high pressure and low pressure turbines which drive the high pressure and low pressure compressors respectively are disposed between the compressors. This arrangement enables the high pressure and low pressure rotors to be spaced apart sufficiently to accommodate between the two turbines a reheating combustion chamber of adequate capacity and simple form without increasing the length of either of the rotor shafts, thereby avoiding the troubles usually experienced with long shafting at low whirling speeds.

Shaft power may be taken from either or both of the rotors or from a separate power turbine arranged co-axially with and adjacent either the high or low pressure turbine. The energy of the exhaust gases may be used in the form of a jet or jets.

The invention will now be described more particularly with reference to the embodiments illustrated in the accompanying drawings, wherein:

Fig. 2 is a similar view to Fig. 1 but illustrates a modification incorporating an intercooler between the low and high pressure compressors.

Fig. 3 is a complete elevation of the Fig. 1 power plant but showing the jet nozzle means in section.

Fig. 4 is a similar view to Fig. 3 but showing the Fig. 2 power plant with the jet nozzle means in section.

Figure 1:
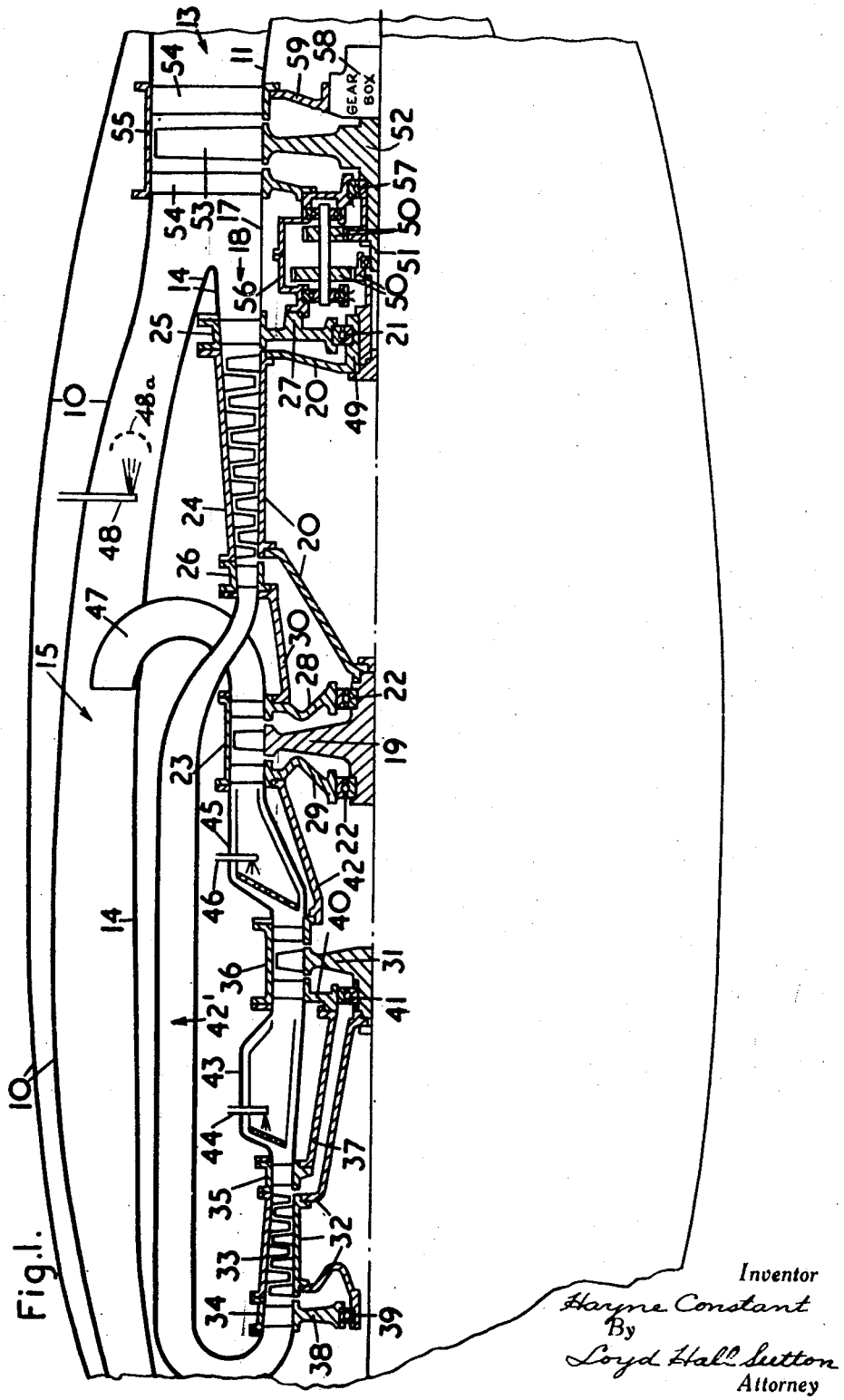
Fig. 1 is a fragmentary half elevation and half radial section of an internal combustion turbine power plant of the double compound engine type for the jet propulsion of aircraft.

Referring to Fig. 1 of the drawings, the power plant comprises, from front to rear, a ducted fan, a low pressure compressor, a low pressure turbine, a high pressure turbine, and a high pressure compressor, these components being arranged in that serial order and in axial alignment. All these components are enclosed in a nacelle 10 which at its forward end and in conjunction with a nose fairing 11 defines an air intake 13, and which in conjunction with an inner fairing 14, enclosing the engine components to the rear of the ducted fan, defines an annular air duct 15 extending rearwardly to a propulsion jet orifice or nozzle at 16 (see Fig. 3). The leading edge of the inner fairing 14 is inturned to define, jointly with a fairing 17, an annular air inlet 18 to the low pressure compressor.

Each of the two turbine compressor rotors is of composite form and comprises an axial flow turbine rotor connected to an axial flow compressor rotor, and each composite rotor operates in a composite stator casing comprising turbine and compressor portions connected together and carrying bearings in which their respective rotors are mounted. Thus the low pressure rotor comprises a bladed turbine wheel 19 and a bladed compressor drum 20 connected together and mounted in front and rear bearings 21, 22 respectively, whilst the composite stator casing for the low pressure rotor comprises a bladed turbine stator portion 23 and a bladed compressor stator portion 24, the latter being mounted between inlet and outlet duct rings 25, 26 respectively. The inlet duct ring 25 is formed integrally with a diaphragm 27 carrying the front bearing 21, and the turbine stator portion 23 is formed integrally with diaphragms 28, 29 which carry the rear bearings 22, whilst a casing ring 30 connects the turbine stator portion 23 to the outlet duct ring 26. Similarly the high pressure rotor comprises a bladed turbine wheel 31 connected to a bladed compressor drum 32, and the high pressure stator comprises a bladed compressor stator portion 33, mounted between entry and exit duct rings 34, 35 respectively, and a bladed turbine stator portion 36 connected by a casing ring 37 to the exit duct ring 35, the entry duct ring 34 being formed with a diaphragm 38 carrying a rear bearing 39 and the turbine stator portion 36 being formed with a diaphragm 40 carrying a front bearing 41. A casing ring 42 connects the turbine stator casing portions 23, 36.

Ducting 42' connects the outlet duct ring 26 of the low pressure compressor to the entry duct ring 34 of the high pressure compressor, said ducting, of which Figure 1 shows a typical axial section, being annularly arranged about the longitudinal axis of the power plant and thus enclosing the two turbines 19, 31, and the high pressure compressor 32 an annularly arranged combustion system 43, in which fuel is burned continuously by a burner jet nozzle 44, connects the exit duct ring 35 of the high pressure compressor to the inlet side of high pressure turbine stator casing 36, while a reheating annular combustion system 45, in which fuel is burned continuously by a burner jet nozzle 46, connects the outlet side of said casing 36 to the inlet side of the low pressure turbine stator casing 23. The exhaust from the low pressure turbine is discharged by annularly arranged ducting 47 into the annular air duct 15 at a point to the rear of a forwardly directed burner jet nozzle 48 whereby fuel is injected and burned in the air stream flowing rearwardly through said annular duct 15. 48ª indicates diagrammatically a semicircular screen adjacent burner 48.

The low pressure rotor drives, through a forwardly extending shaft 49, reduction gearing 50 and a coaxial shaft 51, the bladed fan rotor 52 the blades 53 of which operate between stator fan blades 54 in an annular duct 55 in the air intake 13 and in advance of the leading edge of the internal fairing 14. The reduction gearing 50 is housed in a gear box 56 mounted between the inlet duct ring 25 of the low pressure compressor and the duct 55 and carrying a bearing 57 for the fan rotor 52. A gear box 58 for supplying power for operating engine accessories is driven by fan rotor 52 and is supported within the nose fairing 11 by a diaphragm 59 connected to the fan duct 55.

With the arrangement above described, air entering the intake 13 and initially compressed by the ducted fan is divided by the leading edge of the internal fairing 14 into inner and outer streams of annular section. The outer air stream is heated by passing through the hot zone created by the burner jet nozzles 48 and flows rearwardly through the duct 15 directly to the propulsion jet orifice or nozzle 16. The inner air stream flows through the low pressure compressor, ducting 42' and high pressure compressor into the combustion chamber 43, and the gaseous products of combustion are first expanded through the high pressure turbine, reheated in the combustion chamber 45, then further expanded through the low pressure turbine and finally discharged rearwardly by the ducting 47 into the air stream, flowing through the duct 15.

Referring now to the embodiment illustrated in Fig. 2, wherein like reference numbers to those in Fig. 1 are used to indicate like or analogous parts, the general arrangement is similar to that already described except in the following details:

The burner jet nozzle 48 in the forward portion of the duct 15 is omitted, and the duct 42', instead of directly connecting the low and high pressure compressors, connects them through an intercooler 60 located in the duct 15. The ducting 47 does not discharge into the duct 15 but passes rearwardly to a separate propulsion jet orifice 61 defined between the rear end of the fairing 14 and an exhaust bullet 62 (see Fig. 4). Lagging 63 insulates the duct 42' where it crosses the exhaust ducting 47.

With this arrangement, the air stream flowing through the duct 15 and the gases flowing through the ducting 47 issue as separate concentric propulsion jets.

What I claim as my invention and desire to secure by Letters Patent is:

1. An aircraft power unit comprising a double compound internal combustion turbine having a low pressure rotor consisting of a low pressure compressor and an axial flow low pressure turbine, and a high pressure rotor consisting of a high pressure compressor and an axial flow high pressure turbine, which rotors are coaxially arranged for mechanically independent rotation at different rotational speeds with the low pressure compressor, low pressure turbine, high pressure turbine, and high pressure compressor in that serial order from front to rear of the power unit (considered in relation to the intended direction of flight) and arranged so that flow through the low pressure compressor is in a direction from front to rear of the power unit and that through the high pressure compressor, high pressure turbine and low pressure turbine is in the opposite direction (the intake of the low pressure compressor being at its front end and those of the high pressure compressor and the turbines at the rear ends of these components considered in the intended direction of flight); ducting connecting the discharge (rear) end of the low pressure compressor to the intake (rear) end of the high pressure compressor, said ducting annularly surrounding the turbines and high pressure compressor and entering the latter with reversal of flow; annularly arranged ducting connecting the high pressure compressor high pressure turbine and low pressure turbine and including combustion means at least between the high pressure compressor and high pressure turbine; and exhaust ducting conveying exhaust gases with further reversal of flow from the outlet (front) end of the low pressure turbine enclosed by the inter-compressor ducting to a rearward exhaust outlet external to said inter-compressor ducting.

2. An aircraft power unit as claimed in claim 1, having a bladed rotary propulsion element at the front of the unit in advance of the low pressure compressor, said rotary propulsion element being driven by shaft power taken from the rotor of the low pressure compressor and supplying air under initial compression to said low pressure compressor.

3. An aircraft power unit as claimed in claim 2, wherein the turbine-compressor groups are enclosed by an annular duct which also receives air under initial compression from the bladed rotary propulsion element and discharges rearwardly as a propulsive jet.

4. An aircraft power unit as claimed in claim 3, wherein the exhaust ducting of the low pressure turbine discharges into said annular duct.

5. An aircraft power unit as claimed in claim 1, wherein the turbine-compressor groups are enclosed by an annular duct which also receives air under initial compression from the bladed rotary propulsion element and discharges rearwardly as a propulsive jet and the exhaust from said low pressure turbine discharges through ducting which is separate from and annularly enclosed within said annular duct.

6. An aircraft power unit as claimed in claim 1, wherein reheating combustion means are provided in the ducting between the high pressure and the low pressure turbine additional to the combustion means provided between the high pressure compressor and the high pressure turbine.

HAYNE CONSTANT.

REFERENCES CITED

The following references are of record in the file of this patent:

UNITED STATES PATENTS

| Number | Name | Date |
|---|---|---|
| 2,050,349 | Lysholm et al. | Aug. 11, 1936 |
| 2,280,765 | Anxionnaz et al. | Apr. 21, 1942 |
| 2,375,006 | Larrecq | May 1, 1945 |
| 2,396,911 | Anxionnaz et al. | Mar. 19, 1946 |

FOREIGN PATENTS

| Number | Country | Date |
|---|---|---|
| 436,709 | Great Britain | Oct. 16, 1935 |

OTHER REFERENCES

Ser. No. 367,666, Anxionnaz et al. (A. P. C.), published May 25, 1943.